United States Patent [19]
Dimmick

[11] Patent Number: 5,151,679
[45] Date of Patent: Sep. 29, 1992

[54] DISPLAY SIGN

[75] Inventor: Frederick Dimmick, R.R. No. 3, Parry Sound, Ontario, P2A 2W9, Canada

[73] Assignee: Frederick Dimmick, Parry Sound, Canada

[21] Appl. No.: 831,661

[22] Filed: Feb. 7, 1992

Related U.S. Application Data

[63] Continuation of Ser. No. 271,296, Nov. 15, 1988, abandoned.

[30] Foreign Application Priority Data

Mar. 31, 1988 [CA] Canada ................................. 563009

[51] Int. Cl.⁵ ...................... G08B 27/00; G09F 19/12
[52] U.S. Cl. .................................... 340/326; 340/331; 340/815.16; 340/815.21; 340/815.31; 362/31; 362/32; 362/800; 40/546; 40/547
[58] Field of Search ............................... 340/326–330, 340/321, 331, 332, 815.16, 815.21, 815.22, 815.31; 40/544, 550, 575, 576, 546, 547; 362/31, 32, 800

[56] References Cited

U.S. PATENT DOCUMENTS

| | | | |
|---|---|---|---|
| 3,829,675 | 8/1974 | Mariani | 340/815.31 |
| 4,074,225 | 2/1978 | Vandeweghe | 340/237 |
| 4,141,058 | 2/1979 | Mizohata et al. | 362/32 |
| 4,283,657 | 8/1981 | Gordon et al. | 340/815.21 |
| 4,382,272 | 5/1983 | Quella et al. | 362/32 |
| 4,435,743 | 3/1984 | Plumly | 362/31 |
| 4,530,863 | 7/1985 | Seeger | 40/160 |
| 4,561,203 | 12/1985 | MacDonald, Jr. et al. | 40/570 |
| 4,682,147 | 7/1987 | Bowman | 340/286 R |
| 4,714,983 | 12/1987 | Lang | 362/31 |
| 4,765,701 | 8/1988 | Cheslak | 350/96.1 |
| 4,811,507 | 3/1989 | Blanchet | 362/31 |
| 4,918,578 | 4/1990 | Thompson | 362/812 |

Primary Examiner—Donnie L. Crosland
Attorney, Agent, or Firm—Neil H. Hughes; Ivor M. Hughes

[57] ABSTRACT

A sign comprising at least one light pipe, each light pipe made of light-transmitting material, said at least one light pipe arranged to form a predetermined message or design, each light pipe having at least two ends and carrying at least one light source proximate at least one end, each light source directed towards another end of the light pipe in the direction of extension of the light pipe, a portion of the outer surface of each light pipe being translucent permitting light to exit therefrom, the sign further carrying electrical circuit means for energizing each light source, and means for mounting the at least one light pipe to form the predetermined message or design; whereby energizing of each light source causes light to be transmitted in each light pipe, light therefrom emerging through the translucent outer surface of each light pipe for the display of the predetermined message or design.

56 Claims, 9 Drawing Sheets

DISPLAY SIGN

This is a continuation of application Ser. No. 271,296 filed Nov. 15, 1988, now abandoned.

FIELD OF THE INVENTION

This invention relates to signs which display a message or pattern when illuminated and specifically to emergency exit signs.

BACKGROUND OF THE INVENTION

It is a requirement in most countries according to the national building codes thereof and the fire prevention organizations therein, to provide exit signs near main exits from the lobby of, for example, offices. Most exit signs found within the prior art are powered by either incandescent or fluorescent bulbs contained within a housing having the letters "EXIT" embossed or otherwise fashioned in a plastic planar member wherein the letters are illuminated by the bulbs contained within the exit sign and the background for the letters is normally covered and opaque. Further, there are normally slits in the bottom portion of the exit sign to allow for some down lighting when the main office lighting is shut off either by emergency or necessity.

It is quite customary to power the exit signs by standard 110 Volt A/C current during normal operations and to provide either battery or generator back up for lighting the exit sign during emergencies. In one example of an exit sign, three sockets are provided within the sign which provides for the outer two bulbs being lit during normal operation and the inner bulb being lit during emergency operation.

The afore-mentioned structure is typical of an exit sign found in the prior art wherein the illumination level of the exit sign decreases during the emergency requirement of said exit sign contrary to the desirable attributes of an effective exit sign.

A report prepared by the National Research Council of Canada published in June, 1985, Article No. 24627, entitled "Photometric And Psychophysical Measurements Of Exit Signs Through Smoke", discusses in detail the variables which contribute to the effectiveness of exit signs. One of the main recommendations of the report was that the illumination or brightness of the sign was one of the most important factors in determining the visibility of said exit sign in smoke-filled rooms. Further, it was found that any down lighting embodied as part of prior art exit signs scattered in the smoke and created a degrading effect during the emergency for the exit sign.

Another type of sign found within the prior art is the self-illuminating sign used as an exit sign providing Beta radiation induced by chemi-luminescence of tritium gas. However, such exit signs have been found to be insufficient during an emergency and are questionable as to their visibility as itemized in the afore-mentioned report of the National Research Council.

Beyond the effectiveness of the sign, there is the concern for radiation and such signs must be properly monitored to ensure that there is no leakage from the source and hence creating a real safety hazard instead of being a piece of operating safety equipment.

U.S. Pat. No. 3,026,436, by Hughes, is such a typical device. Although the radioactive material is a phosphorescent material, the principles are very closely resembling products available today.

If a power outage occurs, it is of course desirable for the emergency exit sign to stay lit to provide guidance to the occupants of the building for a safe exit therefrom. However, it is a common feature of incandescent bulbs that those bulbs which have or are approaching their life expectancy may fail during such a power outage, especially if the power outage is caused by a surge thus rendering any exit sign useless. Those bulbs which are weakened because of the surge during the power failure may further fail when the current is turned back on again. Incandescent bulbs also have a problem in that they dissipate a great deal of the energy which they draw as heat. Such heat accumulating in the housing of the exit sign and possible causing an overheating situation destroying members within the exit sign or worse causing a fire.

Fluorescent bulbs on the other hand have other disadvantages well known within the prior art. For example, a ballast resistor must be provided in order to effectively light a fluorescent tube. Ballast resistors are not effective in $-45°$ C. temperature operation as may be the case if the sign were placed within an unheated area or be used externally. It has been found however that LED's (Light Emitting Diodes) do not have such a severe temperature limitation as the operating considerations for fluorescent tubes.

Another consideration from the practical standpoint of exit signs is the maintenance program which must be put in place in order to maintain them, especially when considering a large office structure or complex. If we would consider one exit sign only having three bulbs therein with a lifetime expectancy of approximately four months each, it can be readily seen that a total of nine bulbs will be used in the exit sign for an annual period. These bulbs must be changed by a qualified technician and in some organizations because of union contract requirements an electrician must obtain an extension ladder and replace the burnt out bulbs. Also one must consider for the total cost of the maintenance of such an exercise, the power consumption of the sign, assuming three 15 Watt incandescent bulbs, the cost will vary depending upon the hydro rates within the area of installation. However it is well known that LED's have a considerable longer life than light bulbs or even fluorescent tubes expected to be of the order of thirty years and have considerably less power consumption than the afore-mentioned structures. Further the exit sign components as described herein are effectively shock resistant and rugged in construction withstanding vibration and blows beyond those of incandescent or fluorescent lighting systems.

It is desirable to only light the letters within the exit sign structure and not light all of the remaining area of the sign.

Although discussing the prior art to this invention in relation to exit signs, one may generalize and say that signs in general giving information or direction to the public such as "NO SMOKING", "NO EXIT", "ENTER", or "EXIT/SORTIE", in any language whatsoever "OPEN", "CLOSED", or house numbers or house names would be applicable when considering the maintenance thereof in relation to the applicant's invention. It is therefore not applicant's intention to limit the invention to only exit signs but exit signs are the preferred embodiment of the invention.

U.S. Pat. No. 2,354,367 discloses a display sign as best seen in FIGS. 1 and 4 and described at column 2, line 73 through column 4, line 24, wherein the side surface of the letters is cut in order to provide the diffusion of the light passing through the rods and said rods comprising a bar of methyl-methacrylate. However the light source is not embedded in the rod nor is the light source a light-emitting diode having great reliability in contrast to an incandescent bulb as illustrated in FIG. 1.

U.S. Pat. No. 2,448,244, by Arnold, discloses an illuminated display device having inserted at the end thereof similar to a flashlight a light 100 as best illustrated in FIG. 3 being adjacent the end of a light pipe 10 described at column 2, line 30, made of water white methyl methacrylate resin especially having a relatively high index of refraction and a low critical angle and low absorption of visible light. However such a light pipe does not have an LED embedded in the end thereof to allow light to pass through the sides thereof but the light shines through similar to an optical fibre to the end 103 in FIG. 3.

U.S. Pat. No. 3,578,973 discloses a self-luminous light source having the source embedded in one end thereof a fiber optic type media wherein the light travels to the end of the optical fiber as best illustrated in FIGS. 2 and 3A. Further, since the source is a radioactive source, it is preferred that a bend in the light path be provided to contain the radioactivity in the source. In emergency situations the operation thereof is questionable as described in relation to U.S. Pat. No. 3,026,436.

Another example of a self-illuminating light-emitting unit is found in U.S. Pat. No. 3,409,770 wherein the sources are located within a groove within a plastic body 13 made from transparent polymethylmethacrylate described at column 3, line 65. A transparent elastomeric potting material 17 is then filled in the groove 14 around the tube 10 and the elastomeric cushions 16. A low-temperature curing transparent silicone gel is especially suitable for the potting material. The entire exterior surface body 13 is coated with a light-reflective white paint 20, the practical effect of which is to greatly enhance the uniformity and efficiency of the distribution of light within the unit. The function of the white paint 20 is to provide an opaque coating about the entire body of the unit which reflects as much of the light as possible back into the body and eventually permits it to be transmitted undiminished through the window area. The light source is a particulate phosphorous layer to adhere to and exposed on the phosphoric acid film and a radioactive beta-ray emitting gas within the element. The light is transmitted at 20 as shown in FIG. 2 in a linear relationship with the source within the cavity.

U.S. Pat. No. 3,972,139, by Slomkowski, discloses a device for displaying numbers using bulbs at 60 and a facing 64 wherein the light reflects along a reflective surface 34 as best illustrated in FIG. 3.

U.S. Pat. No. 2,507,909 describes an advertising display using light pipes wherein the light is transferred to the end of the pipe but not on the side thereof.

French Publication No. 2,431,659 as best illustrated in relation to FIGS. 7 and 13 describes a device which can be used for display signs wherein light transfers to the end of the optical fiber.

Nowhere within the prior art is there found an exit sign which increases in illumination during emergency procedures nor which flashes. Further, nowhere within the prior art is there found display signs constructed from light pipes having light-emitting diodes embedded in the ends thereof which illuminate only the letters of the display sign or the pattern of the display and which substantially reduces the maintenance and cost of operation of such exit signs. It is also not disclosed within the prior art to provide an exit sign which is durable and rugged which may withstand the beating which exit signs take especially those installed within institutions such as schools and public housing projects where vandalism is a main concern for superintendents of the buildings.

It is therefore an object of this invention to provide an exit sign and components therefor which overcome all of the afore-mentioned problems in the prior art reducing the maintenance and operating costs of said signs and increasing the life expectancy thereof.

It is further object of this invention to provide lighting elements which are used within display signs which drastically reduce the safety hazards and energy waste of the heat generated within conventional display signs.

It is a further object of this invention to provide an exit sign which may be used in conjunction with security or fire systems installed within buildings in order to carry out special functions and features embodied with the sign.

Further and other objects of the invention will become apparent to a man skilled in the art when considering the following summary of the invention and the more detailed description of the preferred embodiments illustrated herein.

SUMMARY OF THE INVENTION

To these ends according to one aspect of the invention there is provided a sign comprising at least one light pipe, each light pipe made of light-transmitting material (for example acrylic), said at least one lightpipe arranged to form a predetermined message or design, each light pipe having at least two ends and carrying at least one light source (for example a light-emitting diode) proximate at least one end (preferably embedded in such end), each light source directed towards another end of the light pipe in the direction of extension of the light pipe, a portion of the outer surface of each light pipe being translucent permitting light to exit therefrom, the sign carrying electrical circuit means for energizing each light source, and means for mounting the at least one light pipe to form the predetermined message or design; whereby energizing of each light source causes light to be transmitted in each light pipe, light therefrom emerging through the translucent outer surface of each light pipe for the display of the predetermined message or design.

According to another aspect of the invention, there is provided for use as a light source in a sign a light pipe having at least two ends and carrying at least one light source (for example a light-emitting diode) proximate at least one end (preferably embedded in such end), each light source directed towards another end of the light pipe in the direction of extension of the light pipe, a portion of the outer surface of the light pipe being translucent permitting light to exit therefrom, whereby when light is transmitted in the light pipe, the light therefrom emerges through the translucent outer surface of the light pipe.

According to yet another aspect of the invention, means may be provided within the light pipe for scattering some of the light within the light pipe at an angle greater than the critical angle of total internal reflection for the material from which the light pipe is made.

In one embodiment the scattering means comprises bubbles (for example gas bubbles).

In another embodiment some of the bubbles are arranged in a predetermined manner relative to one another, for example forming a circle at the end of the light source in the light pipe.

In another embodiment the light source is embedded in the light pipe.

According to yet another aspect of the invention, there is provided a light pipe for use as illuminating elements in signs, said light pipe comprising at least one portion having two ends and having embedded in at least one end thereof a light source (for example the light pipe comprising an acrylic material having a light-emitting diode embedded therein), the light source directed towards the other end of the light pipe in the direction of extension of the light pipe, the light pipe having disposed adjacent the light source means for scattering some of the light from the light source within the pipe at an angle greater than the critical angle of total internal reflection for the material from which the light pipe is made, a portion of the outer surface of the light pipe being translucent permitting light to exit therefrom; whereby energizing of each light source causes light to be transmitted in the light pipe emerging through the translucent outer surface.

In a preferred embodiment of the invention, there is provided an exit sign in any language comprising a housing, circuit means, a plurality of light pipes, and power supply means:

a) said light pipes comprising plastic portions having at least two ends and having disposed in at least one end thereof light sources (preferably light-emitting diodes), the light source directed towards the other end of the light pipe in the direction of extension of the light pipe, said light pipes being manufactured from transparent material (preferably being of substantially rectangular shape) and having a portion of the outer surface of said pipe being translucent permitting light to exit therefrom in use, said multiplicity of light pipes forming the word "exit" in any language and being interconnected via said circuit means and mounted thereon (preferably said light pipes having light-emitting diodes at each end thereof);

b) circuit means comprising normal low voltage A/C power input means connected to a rectifying means and regulation means which energize the light pipes during normal operation of said exit sign, emergency power supply means in conjunction with rectification means which energize said light pipes during emergency situations, control means for engaging the emergency circuit within said circuit means (preferably said control means comprising a timer and driver for allowing the flashing of the exit sign and for the increase in the illumination level thereof), said control means being accessible remotely to engage the functions of said control means, said circuit means being mountable within said housing;

c) said housing comprising a frame within which said circuit means is contained and having disposed proximate said light pipes a singular sheet of material through which the word "EXIT" may be read clearly, said housing further comprising a mounting means fastened to said framing means for mounting said exit sign in the conventional locations;

d) power supply means for providing power to said exit sign;

whereby the letters of the exit sign are illuminated by said light pipes and the remaining portions of the sign remain unlit.

According to yet another aspect of the invention, the exit sign may comprise light pipes having a substantially rectangular shape and having a predetermined axis, having disposed at each end thereof light-emitting diodes embedded within the light pipe by firstly drilling a hole within the end of the light pipe in which a light-emitting diode will be disposed, mixing the shavings created from drilling the hole with a solvent (preferably methylene chloride) thereby providing a potting mixture, inserting the potting mixture back within the opening in which the light-emitting diode is embedded and allowing it to cure. Preferably the face of the rectangular light pipe opposite the circuit means is painted with a solvent (preferably methylene chloride) and then exposed to vapor thereby rendering said surface translucent.

In a preferred embodiment of the invention, light scattering means are disposed within the light pipe proximate the light source to improve the dispersion of the light through the light pipe.

In another preferred embodiment, the light scattering means are bubbles, some of which are formed within a predetermined pattern about the light source.

According to yet another aspect of the invention, the light pipes may be manufactured from acrylic or epoxy plastic materials wherein the index of refraction allows for substantially total internal reflection of any light engaging any surface other than the translucent surface of said light pipe.

In a preferred embodiment, bubbles created during manufacture around a cone opening within which the LED (Light Emitting Diode) is embedded assist the dispersion of the light which are preferably gas bubbles the majority of light passing through the translucent surface because of the design of the light pipes taking advantage of the substantially total internal reflection of incident light upon all surfaces with the exception of the translucent surface.

According to yet another aspect of the invention, the exit sign may comprise circuit means having auxiliary flashing features wherein the sign may flash during emergency situations.

According to yet another aspect of the invention, the exit may comprise circuit means having means to boost the illumination of the light pipes engaged therewith during emergency situations.

According to yet another aspect of the invention, the circuit means may further comprise audio output means wherein audio signals may be provided in conjunction with increased illumination or flashing of said exit sign.

According to yet another aspect of the invention, a method of fabricating a light pipe is provided, said method comprising forming a hole at least one end of said light pipe (preferably said hole having a cone at the end thereof), capturing the shavings fabricated when forming said hole, mixing said shavings with a solvent (preferably methylene chloride) thereby providing a potting mixture, inserting light sources within the hole formed (preferably said light sources being light-emitting diodes), inserting the potting mixture around the light-emitting diode and allowing said potting mixture to cure.

In a preferred embodiment, when the holes are formed the internal walls of the light pipe adjacent the holes become cloudy and will deter light from passing therethrough, but by providing potting mixture based on a solvent (preferably methylene chloride) the faces of said hole become transparent when the potting mixture is cured.

In a further preferred embodiment of the invention, prior to allowing 100 percent curing of said potting mixture, the light pipes are inclined vertically for a predetermined amount of time to allow some of the gas bubbles created during the curing process to collect at the end of the hole proximate the light source thereby providing light scattering means within said light pipe.

According to yet another aspect of the invention, the exit sign may further comprise the spelling of the word "exit" in any language (for example "SORTIE").

According to yet another aspect of the invention, the display sign may comprise a predetermined message wherein said message is for example "EXIT", "NO SMOKING", "OPEN", "CLOSED", or any other public message in any language.

BRIEF DESCRIPTION OF THE DRAWINGS

The invention will now be illustrated with respect to the following drawings illustrating embodiments of the invention in which.

DETAILED DESCRIPTION OF THE PREFERRED EMBODIMENT

Referring now to the figures embodying the invention there is provided an exit sign which includes in the components thereof a housing, a printed circuit board, and light pipes made from acrylic or epoxy having a generally rectangular shape, having inserted within both ends of the light pipe lightemitting diodes. The circuit board has features therein which allows for the remote control of the exit sign when the building in which the exit sign is installed has a security or a fire prevention system, the advantages of which will be described in relation to the drawings in detail.

By embodying the invention in an exit sign, many advantages are accrued in that light-emitting diodes consume considerably less electric power than 15 or 25 Watt incandescent bulbs or 9 Watt fluorescent bulbs which are typically found within exit signs. Further heat created in typical exit signs will not be created in the preferred embodiment of the invention since light-emitting diodes provide very little heat and specifically when encased in acrylic transparent rods embodying light pipes, only the light rods themselves are being lit and the remaining area within the sign collects very little heat thus reducing any safety concerns of meltdown for the housing or the front covers of the exit sign.

The preferred embodiment further provides an exit sign which is easy to install out of access from vandals and harm. Since the reliability of light-emitting diodes is estimated to be approximately thirty years, it is suggested that the exit signs can be mounted flush with the ceilings so that they are not accessible. Further, in buildings with high ceilings, the signs can be installed once in a remote location without fear of having to maintain the sign continually as is the case with typical signs. The costs of labour and materials in the constant maintenance of signs is eliminated for the most part and the power consumption of the sign is reduced by a minimum factor of approximately 6 to 1.

Further, the preferred embodiment of the invention allows for conditions suggested within the National Research Council paper mentioned within the background of the invention wherein it is stated that the illumination during an emergency is of prime importance.

The preferred embodiment of the invention incorporates primary circuits and secondary circuits within the circuit board which allows for normal use of the exit sign during normal operating conditions and emergency mode of the exit sign during emergency conditions. Thus the two LED's (Light Emitting Diodes) inserted in each end of the light pipe exist to carry out such a function. During normal operation the one lightemitting diode at one end of the light pipe will light and such diode is connected to the primary circuit. However, during an emergency, a secondary circuit will cut in thus providing power to both the primary LED and a secondary LED at each end of the light pipe thus causing both to light giving the appearance when all of the LED's are integrated into the exit sign format of illumination being twice as bright during the emergency situation. Further an audio speaker or device is included on the rear of the exit sign to sound during the emergency. It has been found convenient to provide flashing within the exit sign by incorporating timing devices within a chip which will be described hereinafter to allow for the flashing of the exit sign. The audio signal may sound in conjunction with the flashing or separately.

By not providing any down light from the exit sign, it has also been found superior in that the down light is dispersed by the smoke in a fire and creates a hazard to those attempting to find exit signs and in some cases completely white washes the exit sign from view. However, by eliminating the down light in the preferred embodiment of the invention, only the letters "EXIT" are viewed and therefore a safer egress from the building may be accomplished aided by the additional illumination of the exit sign and the flashing of the letters thereof and the audio signal thereof.

In the preferred embodiment of the invention, the light pipes are made from acrylic rod or epoxy by taking a length of acrylic rod typically between 1 inch and 3 inches depending on the size of the exit sign and drilling a hole in both ends thereof using a drill bit which provides for a conical face at the end of the hole. The shavings which are fabricated by drilling the hole are mixed in conjunction with methylene chloride and are used in preparing a potting mixture. The LED's are then inserted within the end of the acrylic pipes which are substantially rectangular in length and approximately square in section. The potting mixture is then placed around the LED. When the hole is fabricated, the surface surrounding the hole becomes opaque and thus the methylene chloride eliminates the opaque quality of the surface surrounding the hole when the potting mixture is set around the LED and cured, thereby the opaqueness of the surfaces disappears. When epoxy was used the opaqueness remained and thus epoxy is not recommended. Any solvent such as methylene chloride which will render the opaque surfaces transparent is recommended. Further, during the manufacture of said light pipes, bubbles are created during the curing process. If during the curing process when the potting mixture is slightly stiff the light pipe is inclined in a vertical direction with the LED at the bottom end of the light pipe, these bubbles will collect to some extent around the cone of the opening within which the LED is embedded. The bubbles then will assist in the operation of the scattering or dispersing of the light emitting from the LED when in use. It is not necessary that the bubbles be organized to some extent but it is recommended in the preferred embodiment. Not all of the bubbles will assemble in an organized fashion when following the procedure laid out above.

Another important consideration is to ensure that the light passes through one side of the light pipe only and for the most part this is accomplished by coating one side with methylene chloride and exposing that side to water vapor thus causing the surface of the light pipe to become translucent. Thus, by scattering light through the light pipe assisted by the bubbles, all the other sides of the light pipe because of the critical angle of total internal reflection for the material selected and the refractive index of the material selected (in the preferred embodiment acrylic or epoxy). Light will only pass from the side of the translucent-treated portion. It is recommended that the coating be applied as there is a tremendous advantage in doing so. The translucent side may be prepared by physically scoring that side but this is quite time consuming. Further the remaining sides may be coated with metalized tape or internally metalized but this was determined unnecessary. The LED's may be of any convenient colour. Typically red is used, however green may further be used, or any colour which is most desirable. The safety councils of various countries are now experimenting with green as the colour for exit signs but that has not as yet caught with the consumers.

It is of course important that the light pipes be arranged to form the word "exit" as illustrated in the figures wherein if one of the light pipes should fail, the remainder of the light pipes will continue to light and provide a degraded form of an exit sign unlike conventional exit signs wherein if the lights fail the illumination of the sign will be cut in at least half. The exit sign may be used in conjunction with smoke detectors which are tripped to provide a signal to the secondary circuits within the exit sign and cause the audio signal to sound and in conjunction with the flashing of the exit sign. Of course it is not necessary to embody a sign with the word exit, but this is the preferred embodiment of the invention. Alternative signs which may be embodied are "NO SMOKING", "NO EXIT", "ENTER", "EXIT", "WASHROOM", "OPEN", "CLOSED", etc. It is expected that the limit of the light pipe construction will be beyond 8 inches per light pipe. Further, they may be formed by molding techniques known within the art and embodied in one member integrally connected together in alternative embodiments of the invention.

One of the main advantages of the instant invention is that it will eliminate or reduce the need for generators within public institutions such as hospitals, public housing and retirement homes. Typically because of power requirements, when exit signs are installed they must be provided with auxiliary back-up power which may incorporate a generator. The instant invention substantially eliminates the need for these generators for use with exit signs.

The light pipes may be embodied in alternative embodiments of the invention in 7 segmen displays constructed according to the method described above and used in conjunction with remote control afore-said 7 segment display wherein microcomputers or other known remote units may access the sign and display the necessary segments. Because the light-emitting diodes within the instant invention are operable by low voltage low current logic level signals such features as remote control are possible. The power consumption of the preferred embodiment of the invention varies between 1 to 3 Watts depending upon whether the power supply is 12 Volt, 6 Volt or 24 Volt, and the level of illumination.

Figure 1:
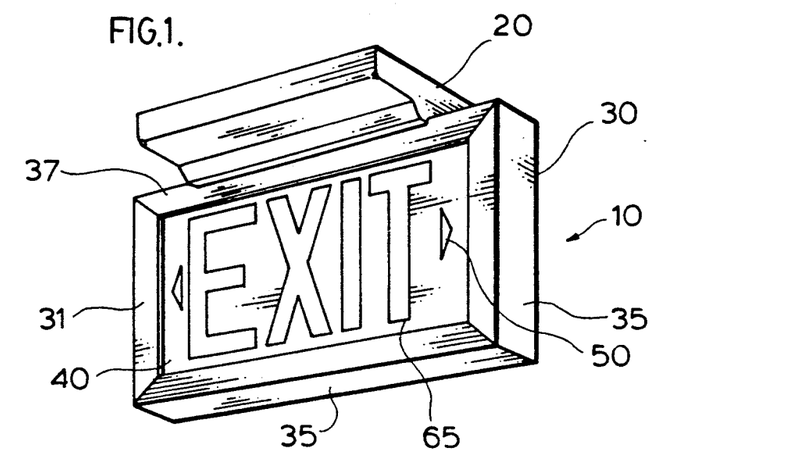
FIG. 1 is a perspective view of an exit sign in a preferred embodiment of the invention.

Referring now to FIG. 1, there is illustrated an exit sign 10 being mounted upon a base or platform 20 which is normally mounted to a ceiling or a structural member having a framing portion 30 surrounding the substrate portion 40 wherein the words "EXIT" 65 are displayed. The word "EXIT" is surrounded by framing portions 31, 33, 35 and 37 and has triangular portions 50 as indicating arrows described on the face of the substrate 40.

Figure 2:
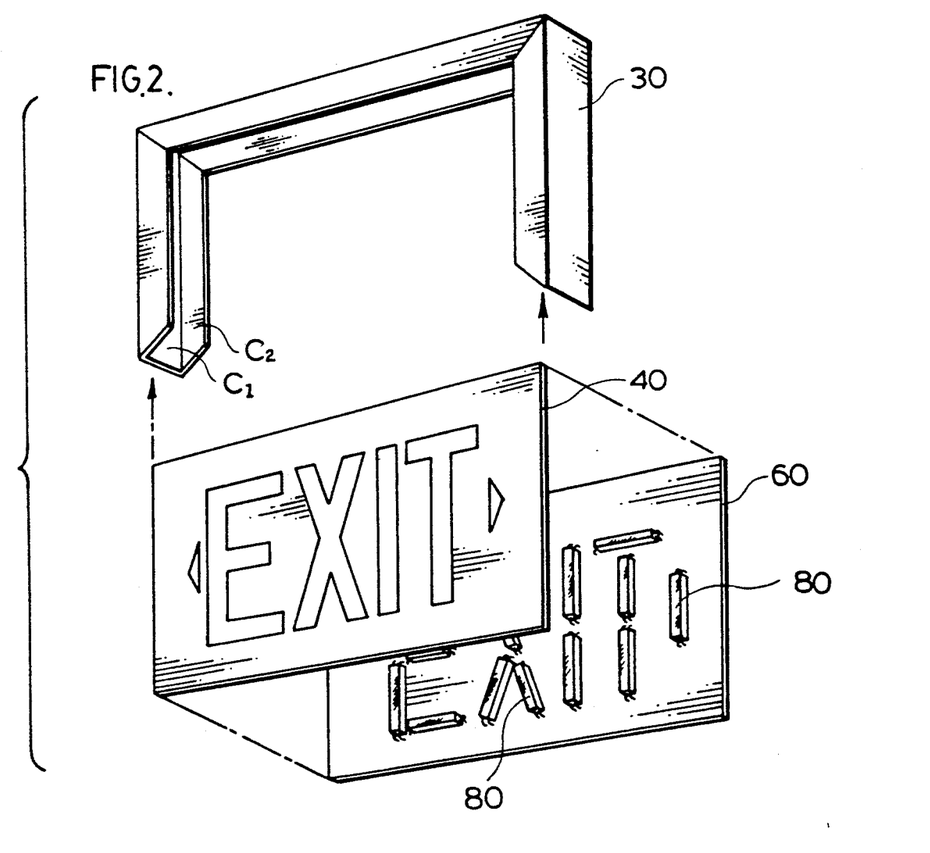
FIG. 2 is an exploded view of the exit sign in FIG. 1 in a preferred embodiment of the invention.

Referring now to FIG. 2 wherein the sign of FIG. 1 is illustrated in exploded terms in order to view the components within exit sign 10, therefore there is provided the framing portion 30 within which the substrate 40 slides within a channel $C_1$ within the framing portions of the exit sign. Further printed circuit board 60 is provided upon which light pipe portions 80 are mounted which are mounted in such a way as to form the word "EXIT". The light pipes 80 may be integrally formed by injection molding techniques known in the art and are preferably made from acrylic or epoxy. Thus when the light pipes are illuminated as will be hereinafter described the letters "E", "X", "I" and "T" will be illuminated being transparent on the substrate 40 wherein the balance of the substrate is normally black or white. The letters "E", "X", "I" and "T" are normally red or green.

Figure 2A:
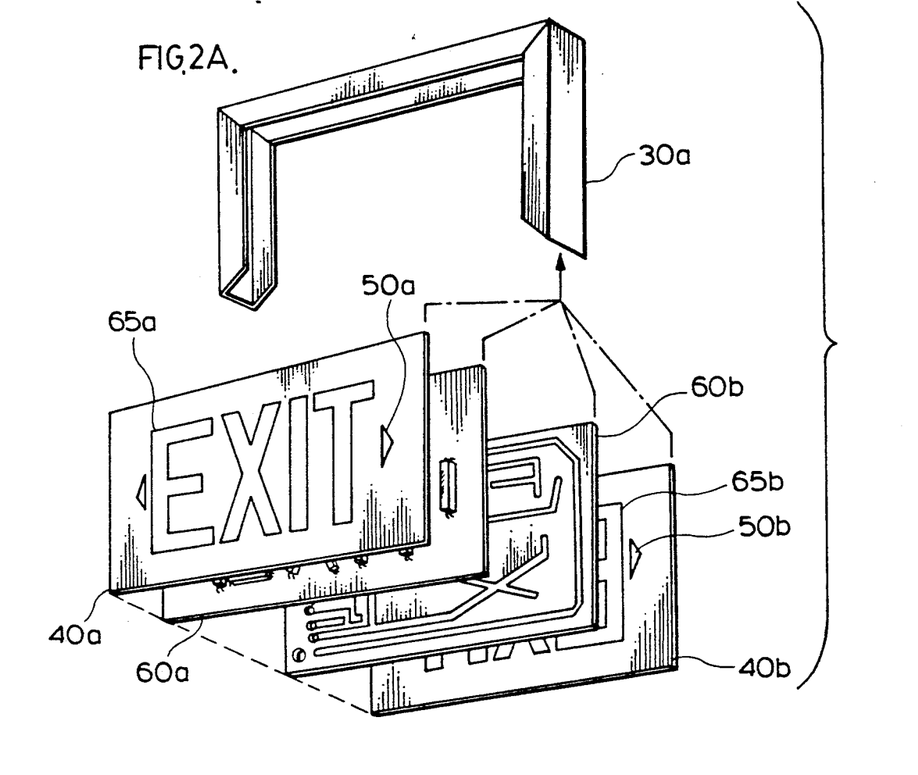
FIG. 2A is an exploded view of an alternative embodiment of the invention illustrated in perspective.

Referring now to FIG. 2A, there is illustrated an alternative embodiment of the invention wherein a framing portion 30A is illustrated within which the substrate 40A and 40B are inserted wherein the word "EXIT" will be indicated from both sides of the exit sign. Therefore there is provided as well two printed circuit boards 60A and 60B upon which are located a multiplicity of light pipes 80 spelling out the word "EXIT". As mentioned in relation to FIG. 2, it is possible again to mold all of the letters from acrylic or epoxy or any plastic by conventional methods and mount them upon the printed circuit board of the instant invention.

Figure 2B:
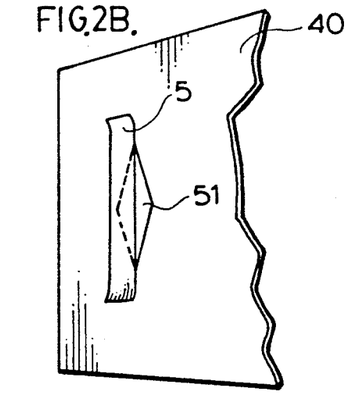
FIGS. 2B and 2C are close-up views of the substrate member 40 having diamond-shaped portions 51 and 50 in alternative embodiments of the invention.
Figure 2C:
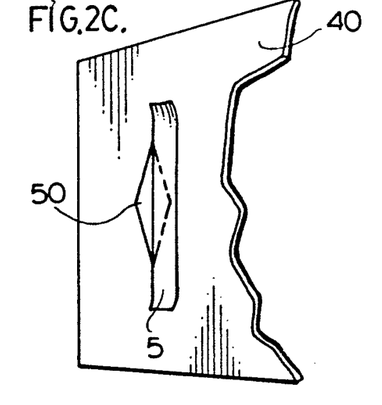

Referring now to FIGS. 2B and 2C, there is illustrated a close-up cross-sectional view of the substrate 40 indicating an alternative embodiment of the invention having a diamond-shaped member 50 and 51, respectively, wherein a piece of tape matching the background of the substrate 5 is placed over one-half of the diamond-shape in order to change the indicating arrows from one direction to another as is required by the installation of the exit sign.

Figure 3:
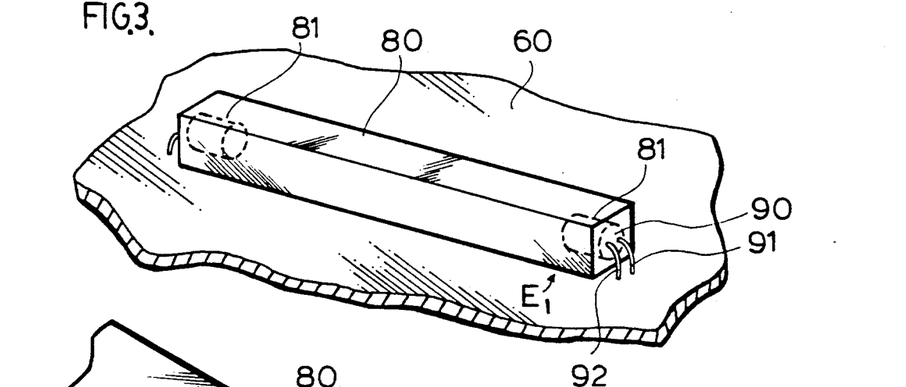
FIG. 3 is a close-up view of the circuit board 60 illustrating the light pipe in a preferred embodiment of the invention.

Referring now to FIG. 3, there is illustrated a close-up of the light pipe installed within a circuit board 60, a light pipe 80 and the two ends having disposed at each end light-emitting diodes 81 embedded within the ends of the acrylic light pipe 80 being manufactured by the method as previously described above. At end $E_1$ therefore there is located LED 90 having connections 91 and 92 connected to the printed circuit board by conventional methods.

Figures 4, 5:
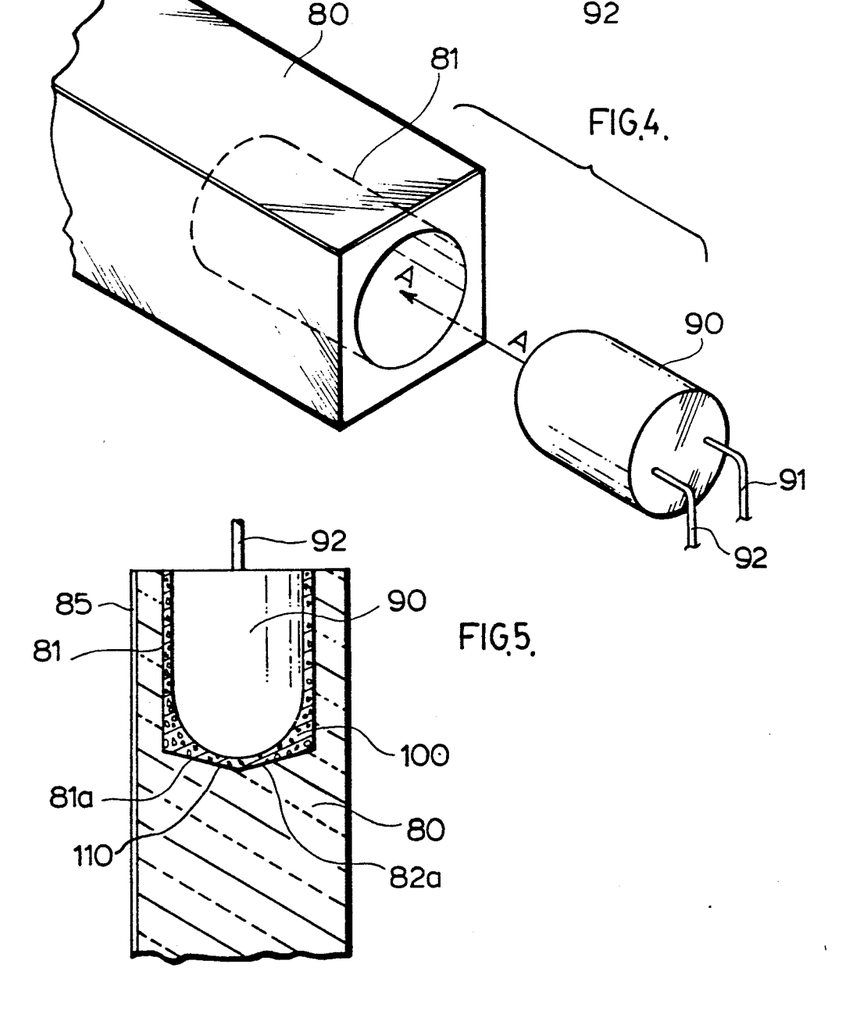
FIG. 4 is a close-up view of the end $E_1$ of the light pipe illustrated in FIG. 3 showing the assembly thereof in a preferred embodiment of the invention.
FIG. 5 is a cross-sectional plan view across the axis AA in FIG. 4 in a preferred embodiment of the invention.

Referring now to FIG. 4, there is illustrated a close-up view in perspective of the end $E_1$ of the light pipe 80 of FIG. 3 wherein the LED is to be installed along a central axis AA within an opening 81 within a light pipe 80. The opening 81 is slightly larger than the diameter of the lightemitting diode 90 in order to allow for a snug fit. The method of inserting the light-emitting diode 90 into the opening 81 is described above wherein a potting mixture is poured around the light-emitting diode as will be described in relation to FIG. 5.

Referring now to FIG. 5, there is illustrated a cross-section through the central axis AA of FIG. 4 wherein the light-emitting, diode 90 is placed within opening 81 wherein the potting mixture being a mixture of methylene chloride or any suitable solvent, will turn the frosted surface of the hole 81 transparent when mixed with the shavings of the acrylic. Further the hole is illustrated having a conical end remote the connector 92 wherein bubbles collect 110 which will assist in dispersing the light from the light-emitting diode when the light pipe is operational. An outer surface 85 has been painted with methylene chloride and subsequently exposed to water vapor in order to provide a translucent outer surface through which the light exiting the light pipe will pass as mentioned above.

Figure 6:
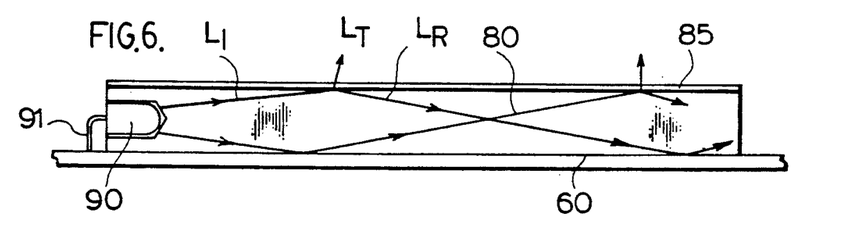
FIG. 6 is a cross-section of the light pipe 80 illustrated in FIG. 3 across the axis AA in a preferred embodiment of the invention.

Referring now to FIG. 6, there is illustrated a light pipe 80 mounted upon the printed circuit board 60 via pin 91 wherein the light-emitting diode 90 is emitting light $L_I$ wherein the light reflects off of most of the surfaces within the light pipe as described above in that the angle of incidence of the light $L_I$ upon all the surfaces within the light pipe is less than the critical angle of total internal reflection for the index of refraction for acrylic and for that matter any plastic rod selected. Thus the light $L_I$ reflects off the surface and creates a reflected beam LR which further reflects off opposite surfaces until some of the light passes through the translucent case 85 of the light pipe 80. Thus the light LT, which is some of the total light within the system, passes toward the substrate of the exit sign. It is recommended that coating 85 be present in all situations, wherein metalized tape may be used or internal metalization of the rod itself may be provided. However it has been found that it is not necessary when dealing with most plastic materials to take the costly steps of metalizing or taping.

Figure 7:
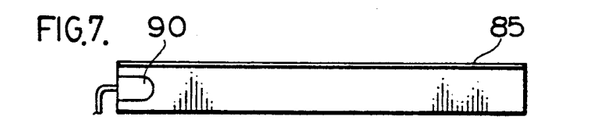
FIGS. 7 through 9 are similar to FIG. 6 illustrating schematically alternative operations of the instant invention in a preferred embodiment of the invention.
Figure 8:
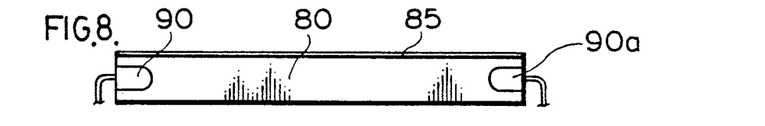
Figure 9:
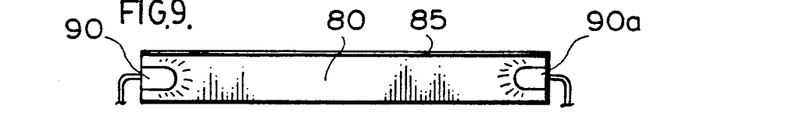

Referring now to FIGS. 7 through 9, there is illustrated a light pipe having in FIG. 7 one LED disposed in one end thereof, in FIG. 8 having two LED's, each disposed in each end of the light pipe, and in FIG. 9 having both LED's lit simultaneously. Thus during normal operation of the exit sign LED 90 will be lit according to the details of the circuit which will be hereinafter described until such time as an emergency exits or such time as a remote control device activates the secondary circuit wherein LED 90A is in communication, thus lighting both LED's during emergency situations as illustrated in FIG. 9 which may in turn be flashing thus accomplishing one of the objectives of the invention wherein the light pipe illuminates at substantially twice the illumination level during an emergency as it does during normal operating conditions.

Figure 10:
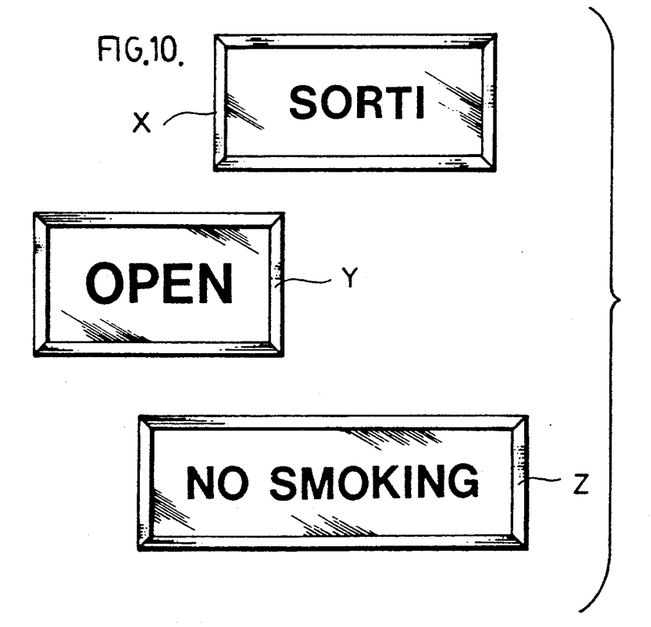
FIG. 10 is an illustration of a number of alternative embodiments of the invention.

Referring now to FIG. 10 there is illustrated an assortment of display signs in alternative embodiments of the invention wherein sign X is a "SORTI" sign for French or bilingual installations as an example only. Sign Y describes a display sign which is used to indicate that a teller or a store is open or closed, and finally sign Z is indicated as a "NO SMOKING" directive to the general public.

Figure 11A:
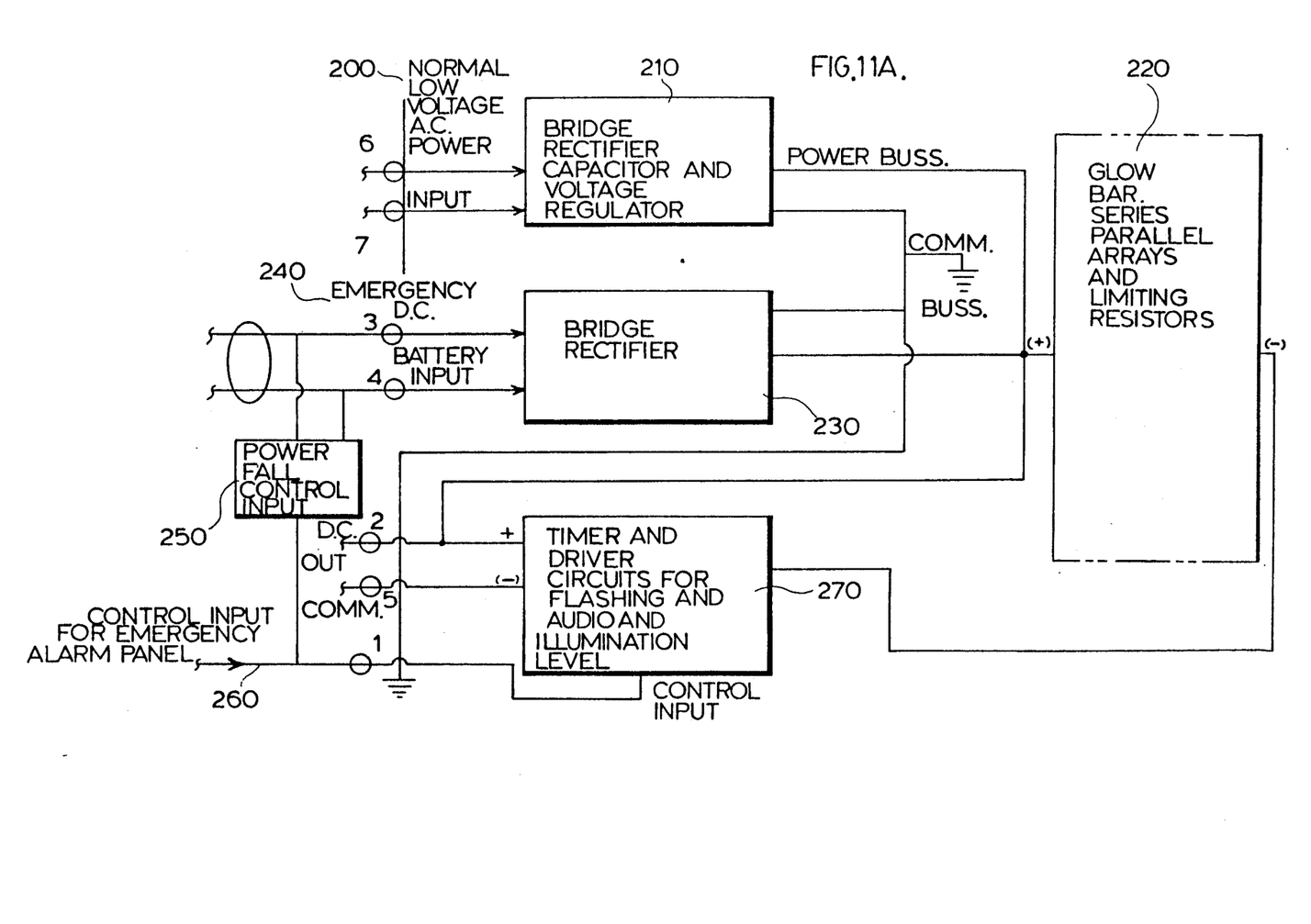
FIG. 11A is a schematic block diagram illustrating the functionality of the circuit board 60 and the programmed features therein in a preferred embodiment of the invention.

Referring now to FIGS. 11 and 11A wherein a schematic diagram of the circuitry within the printed circuit board is illustrated having a normal low voltage A/C power input 200 powering the circuitry of the exit sign during normal operating conditions and passing through a bridge rectifier and voltage regulator 210 through to a glow bar or light pipe assembly 220 wherein only one LED at one end of the light pipe as illustrated in relation to FIGS. 7 through 9 is connected to the normal input 200. Further there is provided emergency D/C battery input which may be 12, 6, or 24 Volt input which passes through a bridge rectifier through to the normally operating LED's and the emergency operating LED's with each light pipe, which lights because of a jumper formed by two diodes at 250. The second LED within the light pipe is illustrated in FIGS. 7 through 9 should the power fail. Further a timing device driver 270 is incorporated which will react to either the control input from an emergency alarm panel 260 or to the diodes 250 tripping and provide flashing of the light pipes and thus the exit sign at double the illumination during emergency procedures. Further the illumination level may be boosted and an audio signal may be provided coordinated by the timer and driver 270.

Figure 12:
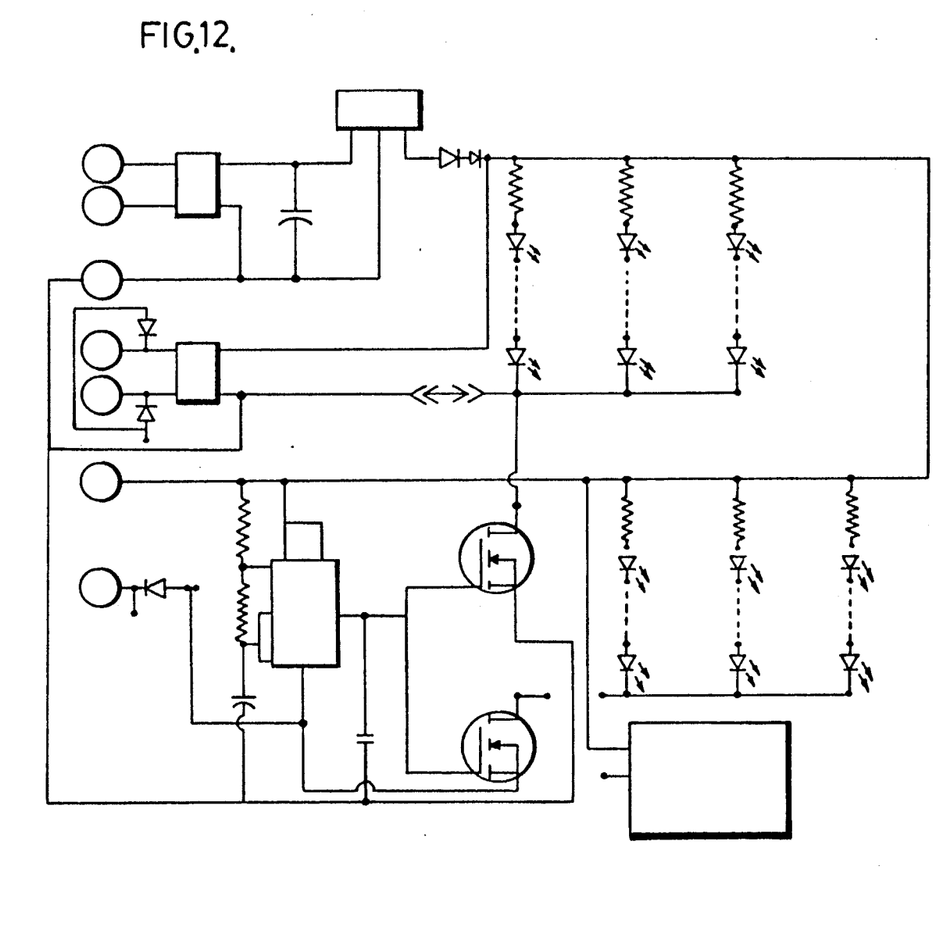
FIGS. 12, 12A and 12B are circuit diagrams illustrating a more detailed breakdown of the electrical components required to facilitate the functions itemized in FIG. 11A in a preferred and alternative embodiment of the invention.
Figure 12A:
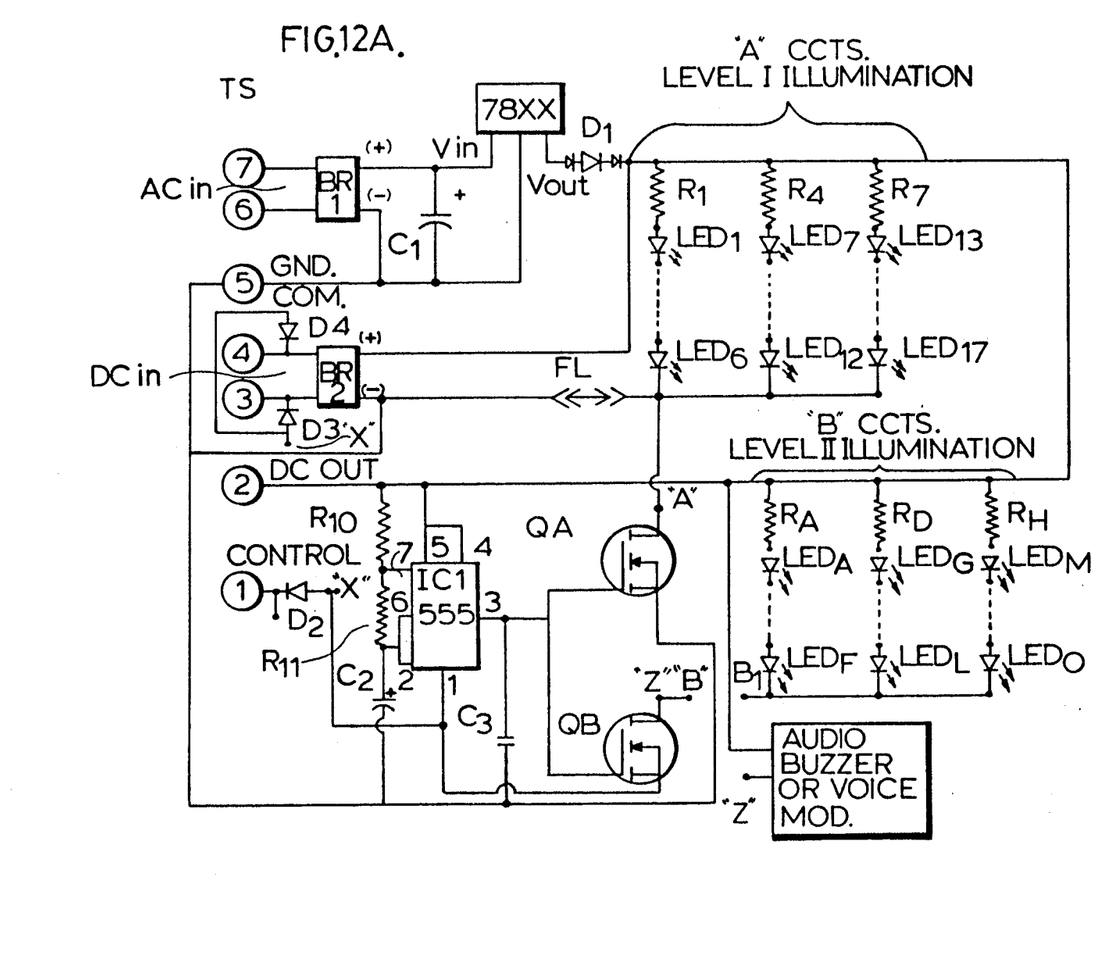
Figure 12B:
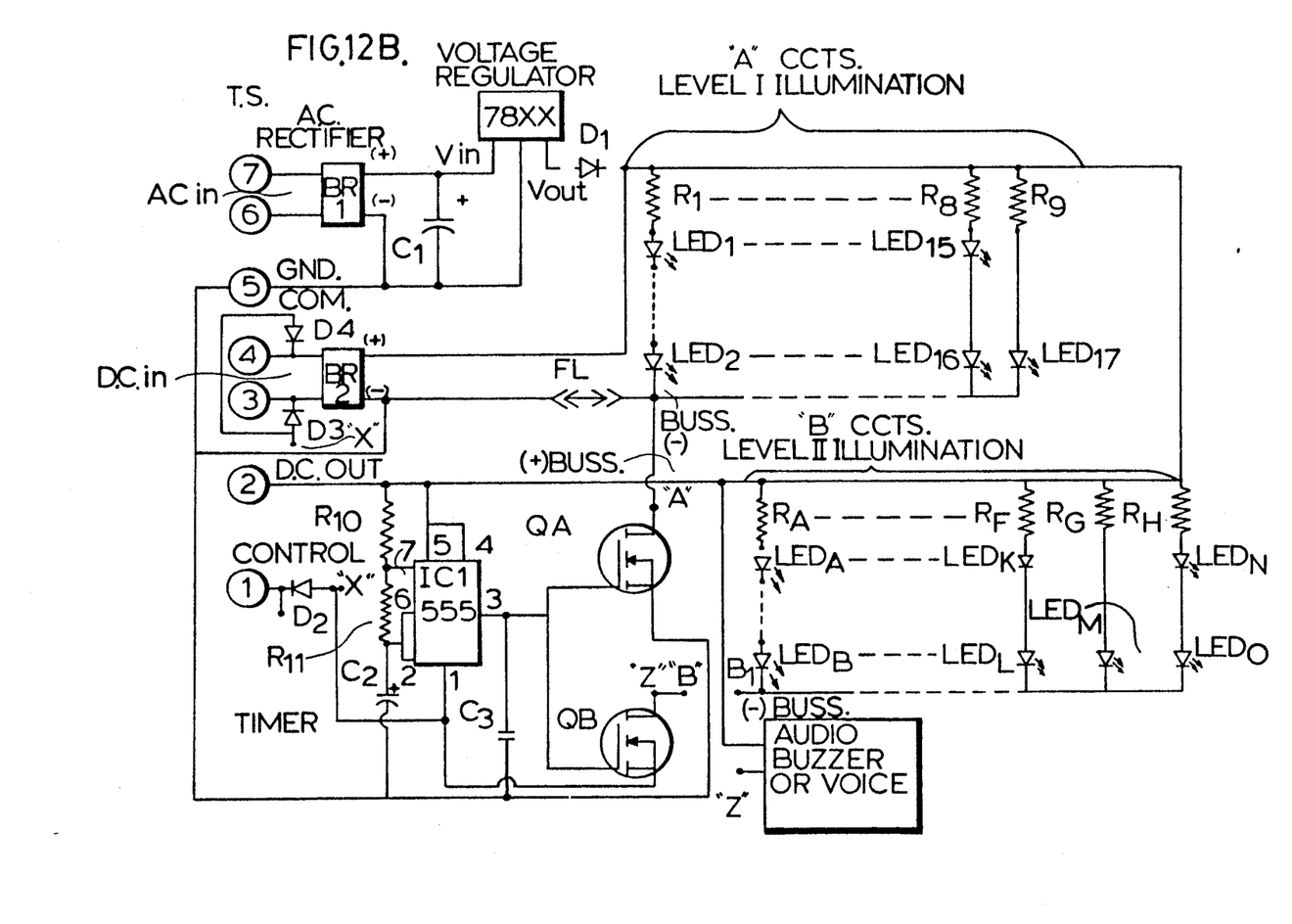

Referring now to FIGS. 12, 12A and 12B, there is provided a schematic circuit diagram of the block diagrams found in FIGS. 11 and 11A illustrating in detail the operation of the electrical circuit wherein an alternating :current input is illustrated at terminals 6 and 7 which pass through a rectifier $BR_1$ and through a voltage regulator 78XX through a number of diodes illustrated in this preferred embodiment as 3 and then passing on to light series pairs of light-emitting diodes incorporated with compatible resistors $R_1$ through $R_7$ when the light-emitting diodes LED 1 through 17 provide normal lighting within the glow bar as illustrated in FIG. 7. A D/C input at 3 and 4 further passes through the bridge rectifier BR2 and will light both normal light-emitting diodes LED 1 to LED 17 as well as LED A through LED O in the emergency situation as illustrated in relation to FIG. 9. For such to be accomplished, a ground circuit is provided with a jumper "X" which in turn is connected through to a secondary circuit comprising a timer and driver which is embodied in a micro chip further connected with two mosfets Qa and Qb (metal oxide semi-conductor field effect transistors which have high impedance and low transconductance) wherein only Qa is enabled during normal operation and Qb is enabled during emergency operations in order to fire the light-emitting diodes thus allowing for the flashing of the light-emitting diodes during emergency situations if such a feature is desirable. Of course it is not necessary to include the flashing in every alternative embodiment of the invention. Assuming normal level operation to be a Level I operation and emergency operation to be Level II operation, the details of the circuitry will now be described.

Referring to FIG. 12B, under normal operating conditions, 6.3 vac is applied across input terminals 6 and 7 to bridge rectifier BR1 and input capacitor C1. BR1 provides D.C. voltage to input capacitor C1 and 5 volt 78XX series 3-pin fixed voltage regulator.

A +5vdc from the regulator is dropped to +4.3 vdc by D1 which also protects the regulator from reverse E.M.F. from D.C. input BR2.

At Level 1 illumination, a +4.3 volts on positive buss serves 'A' circuits, 8 limiting resistors R1-R8 with series pairs of LED's (1-16) plus 1 single R9 with LED 17, with a final cathode of each circuit connected to negative buss 'A' for Level 1 illumination.

If Level II (optional) illumination is required on a continuous basis 'B' circuits, 8 more Ra-RH limiting resistors with 7 series pairs of LED's (A-L and N and O) plus 1 single Rg with LED M are connected to the negative buss 'B'. An optional jumper from point B1 to point A of circuit board must then be placed to enable B circuits.

Flashing is produced by cutting 'FL' trace on the circuit board and installing 2 N channel power mosfets Qa and Qb and IC1 timer network comprised of R10, R11, C2, C3 and 555 timer chip. R10, R11, and C2 determine duty cycle while C3 damps ringing of power mosfets. During normal operation IC1 and Qb are disabled by absence of ground on 1 of terminal strip. Pin 3 of IC1 is high and A1 is gated on enabling any circuit connected to point 'A'. When 1 of the terminal strip is grounded IC1 and Qb are enabled, IC1 then commences to switch both Qa and Qb in and out of conduction producing the flashing sequence.

For retrofitted installations, flashing can be provided in emergency power fail situation without rewiring, by placing diodes D3 and D4 and jumper 'X'. When the power has failed, emergency power supply energizes the D.C. input to the sign. The diodes D3 and D4 steer negative potential to pin 1 of 555 initiating flashing until power is restored to the emergency supply.

Remote control of the flashing circuit can be achieved from fire alarm or smoke detection equipment by looping terminal #5 (GND) of the circuit board to terminal #1 (CONTROL), or by providing earth ground to terminal #1, and grounding terminal #5 to earth at the sign.

When equipped if 'Z' point on BUZ terminal of the circuit board is jumpered to 'Z' point of Qb, an audible signal will follow the flashing frequency. If it is desired to have flashing only, on emergency power failure; and an audible signal and flashing on fire or smoke alarm only, then diodes D3, D4 and jumper 'X' are placed and audible signal jumper 'Z' is connected from 'Z' point of BUZ terminal of the circuit board to terminal #1 side of diode D1. If an audible signal is the only required option then the 'Z' point of BUZ terminal of the circuit board is connected to #1 of the terminal strip and remote control or power fail ground will activate it.

During emergency power failure 6vdc power appears across terminals 3 and 4 of the terminal strip from the emergency battery supply. Bridge rectifier BR2 ensures the polarity of the D.C. supply while dropping voltage to +4.6vdc to the positive buss. This results in an actual increase in illumination levels initially, caused by 0.3v step up in supply voltage to the LED's. Illumination is maintained slightly above normal until the emergency supply voltage drops by more than 5%.

Most conventional signs operated from emergency battery supplies resort to a low wattage incandescent bulb, resulting in a major drop in illumination during an emergency.

If Level II illumination is only required during emergency power failure or alarm conditions connect point B1 on the circuit board to point B.

For 12 or 24 Volt operation circuit functions are the same, except that limiting resistors and LED's are reconfigured, and the voltage regulator is a 7812.

Limiting resistor values vary with operating voltage and LED current and voltage requirements and series parallel arrangements.

Power consumption is designed to be 20 ma. per circuit leg. Approximately 60ma./12vdc for Level I illumination, and 120ma/12vdc for Level II illumination, or less than 1 and 2 Watts respectively. 6 Volt operation results in slightly over 1 and 2 Watts for Levels I and II illumination, 24 Volt operation results in approximately 1.5 and 3 Watt consumption.

Figure 13:
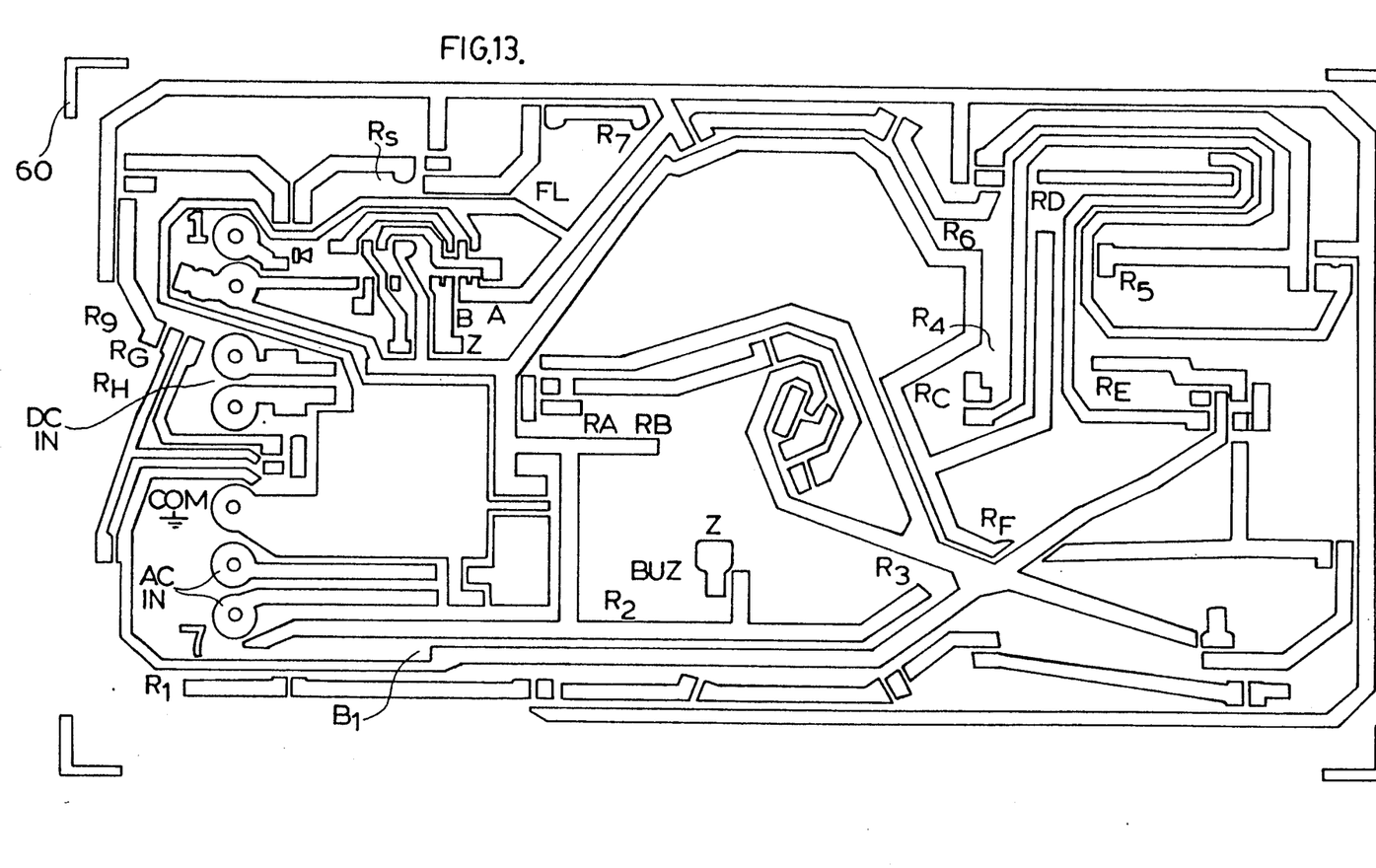
FIG. 13 is a printed circuit board embodying the circuitry illustrated in FIGS. 12, 12A and 12B in a preferred embodiment of the invention.

Referring now to FIG. 13 there is provided a diagram of the printed circuit board embodying the characteristics of FIGS. 12A and 12B, the use and connection for which will become apparent to a man skilled in the art when comparing the diagram of the printed board with the details of FIGS. 12 through 12B.

As many changes can be made to the preferred embodiments of the invention without departing from the scope of the invention, it is intended that all material contained herein by interpreted as illustrative of the invention and not in a limiting sense.

The embodiments of the invention in which an exclusive property or privilege is claims are as follows:

1. A sign comprising at least one light pipe of a suitable material of substantially uniform index of refraction having a longitudinal axis of extension, said at least one light pipe made of light-transmitting material, said at least one light pipe for displaying a predetermined message or design, said at least one light pipe having at least two ends and carrying at least one light source being a light-emitting diode proximate at least one end wherein the at least one light source is contained in said at least one end, said light source directed towards anther end of the light pipe in the direction of the longitudinal axis of extension of the light pipe, a portion of the outer surface of said light pipe being translucent permitting light to exit therefrom, the sign further carrying electrical circuit means for energizing said light source, and means for mounting the at least one light pipe to display the predetermined message or design; whereby energizing of said light source causes to be transmitted in said light pipe, light therefrom emerging through the translucent outer surface of said light pipe for the display of the predetermined message or design.

2. The sign of claim 1 wherein said light pipe is made of acrylic.

3. The sign claim 1 or 2 wherein light scattering means are disposed within the light pipe proximate the light source to improve the dispersion of the light through the light pipe.

4. The sign of claim 3 wherein the light scattering means are bubbles, some which are formed in a predetermined locations about the light-emitting diode.

5. The exit sign of claim 4 wherein the light pipes are manufactured from acrylic or epoxy plastic materials wherein the index of refraction allows for substantially total internal reflection of any light engaging any surface other than the translucent surface of said light pipe.

6. The exit sign of claim 3 wherein the light pipes are manufactured from acrylic or epoxy plastic materials wherein the index of refraction allows for substantially total internal reflection of any light engaging any surface other than the translucent surface of said light pipe.

7. The sign of claim 1 wherein means are provided within the light pipe for scattering some of the light within the light pipe at an angle greater than the critical angle of total internal reflection for the material from which the light pipe is made.

8. The light pipe of claim 7, wherein the scattering means comprises bubbles.

9. For use as a light source in a sign a light pipe having at least two ends of a suitable material of substantially uniform index of refraction, having a longitudinal axis of extension, and carrying at least one light source being a light emitting diode proximate at least one end wherein the at least one light source is contained in said at least one end, said light source directed towards another end of the light pipe in the direction of the longitudinal axis of extension of the light pipe, a portion of the outer surface of the light pipe being translucent permitting light to exit therefrom, whereby when light is transmitted in the light pipe, the light therefrom emerges through the translucent outer surface of the light pipe.

10. The light pipe of claim 9 wherein bubbles created during manufacturing around an opening within which the LED (Light Emitting Diode) is contained assists the dispersion of the light, the majority of light passing through the translucent surface because of the design of the light pipes taking advantage of the substantially total internal reflection of incident light upon all surfaces with the exception of the translucent surface.

11. The light pipe claim 9 wherein means are provided within the light pipe for scattering some of the light within the light pipe at an angle greater than the critical angle of total internal reflection for the material from which the light pipe is made.

12. The light pipe of claim 11 wherein the scattering means comprises bubbles.

13. The light pipe of claim 9 wherein light scattering means are disposed within the light pipe proximate the light source to improve the dispersion of the light through the light pipe.

14. The light pipe of claim 13 wherein the light scattering means are bubbles, some of which are formed in a predetermined location about the light-emitting diode.

15. A light pipe for use as illuminating elements in signs, said light pipe comprising at least one portion having two ends, of a suitable material of substantially the uniform index of refraction, having a longitudinal axis of extension and having contained in at least one end thereof a light source being a light-emitting diode, the light source directed toward the other end of the light pipe in the direction of the longitudinal axis of extension of the light pipe, the light pipe having disposed adjacent the light source means for scattering some of the light from the light source within the pipe at an angle greater than the critical angle of total internal reflection for the material from which the light pipe is made, a portion of the outer surface of the light pipe being translucent permitting light to exit therefrom; whereby energizing of each light source causes light to be transmitted int he light pipe emerging through the translucent outer surface.

16. The light pipe of claim 15 wherein the light pipe comprises an acrylic material having a light-emitting diode embedded therein.

17. An exit sign comprising a housing having a frame, circuit means, a plurality of light pipes, and power supply means:

a) said light pipes of a suitable material of substantially uniform index of refraction, having a longitudinal axis of extension comprising plastic portions having at least two ends and having disposed in at least one end thereof light sources, the light sources directed towards the other end of the light pipe in the direction of the longitudinal axis of extension of the light pipe, said light pipes being manufactured from transparent material and having a portion of the outer surface of said pipe being translucent permitting light to exit therefrom in use, said multiplicity of light pipes displaying the word "exit" and being interconnected with said circuit means and mounted therewith;

b) circuit means comprising normal low voltage A/C power input means connected to a rectifying means and regulation means which energize the light pipes during normal operation of said exit sign, emergency power supply means in conjunction with rectification means which energize said light pipes during emergency situations, control means for engaging the emergency circuit within said circuit means, said control means being accessible remotely to engage the functions of said control means said circuit means being mountable within said housing;

c) said housing comprising a frame within which said circuit means is contained and having disposed proximate said light pipes a singular sheet of material through which the word "EXIT" may be read clearly, said housing further comprising a mounting means fastened to said frame for mounting said exit sign;

d) power supply means for providing power to said exit sign; whereby the letters of the exit sign are formed of illuminated light pipes.

18. The exit sign of claim 17 wherein the light sources are light-emitting diodes.

19. The exit sign of claim 17 or 18 wherein the light pipes are of substantially rectangular a shape.

20. The exit sign of claim 17 or 18 wherein said control means comprises a timer and driver for allowing flashing of the exit sign and for the increase in the illumination level thereof.

21. The exit sign of claim 19 wherein said control means comprises a timer and driver for allowing flashing of the exit sign and for the increase in the illumination level thereof.

22. The exit sign of claim 17 or 18 wherein the exit sign comprises light pipes having a substantially rectangular shape and having a predetermined axis, having disposed at each end thereof light-emitting diodes embedded within the light pipe by firstly drilling a hole within the end of the light pipe in which a light-emitting diode will be disposed, mixing the shavings created from drilling the hole with a solvent thereby providing a potting mixture, inserting the potting mixture back within the opening in which the light-emitting diode is embedded and allowing it to cure.

23. The exit sign of claim 20 wherein the exit sign comprises light pipes having a substantially rectangular shape and having a predetermined axis, having disposed at each end thereof light-emitting diodes embedded within the light pipe by firstly drilling a hole within the end of the light pipe in which a light-emitting diode will be disposed, mixing the shavings created from drilling the hole with a solvent thereby providing a potting mixture, inserting the potting mixture back within the opening in which the light-emitting diode is embedded and allowing it to cure.

24. The exit sign of claim 21 wherein the exit sign comprises light pipes having a substantially rectangular shape and having a predetermined axis, having disposed at each end thereof light-emitting diodes embedded within the light pipe by firstly drilling a hole within the end of the light pipe in which a light-emitting diode will be disposed, mixing the shavings created from drilling the hole with a solvent thereby providing a potting mixture, inserting the potting mixture back within the opening in which the light-emitting diode is embedded and allowing it to cure.

25. The exit sign of claim 22 wherein the solvent is methylene chloride.

26. The exit sign of claim 23 wherein the solvent is methylene chloride.

27. The exit sign of claim 22 wherein the face of the rectangular light pipe opposite the circuit means is painted with a solvent and then exposed to vapor thereby rendering said surface translucent.

28. The exit sign of claim 23 wherein the face of the rectangular light pipe opposite the circuit means is painted with a solvent and then exposed to vapor thereby rendering said surface translucent.

29. The exit sign of claim 25 wherein the face of the rectangular light pipe opposite the circuit means is painted with a solvent and then exposed to vapor thereby rendering said surface translucent.

30. The exit sign of claim 26 wherein the face of the rectangular light pipe opposite the circuit means is painted with a solvent and then exposed to vapor thereby rendering said surface translucent.

31. The exit sign of claim 27 wherein the solvent is methylene chloride.

32. The exit sign of claim 28 wherein the solvent is methylene chloride.

33. The exit sign of claim 30 wherein the solvent is methylene chloride.

34. The exit sign of claim 18 wherein said light pipes have light-emitting diodes at each end thereof.

35. The exit sign of claim 17 or 18 wherein light scattering means are disposed within the light pipe proximate the light source to improve the dispersion of the light through the light pipe.

36. The exit sign of claim 35 wherein the light scattering means are bubbles, some of which are formed in a predetermined location about the light-emitting diode.

37. The exit sign of claim 17 or 18 wherein the light pipes are manufactured from acrylic or epoxy plastic materials wherein the index of refraction allows for substantially total internal reflection of any light engaging any surface other than the translucent surface of said light pipe.

38. The exit sign of claim 22 wherein the light pipes are manufactured from acrylic or epoxy plastic materials wherein the index of refraction allows for substantially total internal reflection of any light engaging any surface other than the translucent surface of said light pipe.

39. The exit of claim 23 wherein the light pipes are manufactured from acrylic or epoxy plastic materials wherein the index of refraction allows for substantially total internal reflection of any light engaging any surface other than the translucent surface of said light pipe.

40. The exit sign of claim 17 or 18 wherein bubbles created during manufacturing around an opening within which the LED (Light Emitting Diode) is contained assist the dispersion of the light, the majority of light passing through the translucent surface because of the design of the light pipes taking advantage of the substantially total internal reflection of incident light upon all surfaces with the exception of the translucent surface.

41. The exit sign of claim 17 or 18 wherein the exit sign comprises circuit means having auxiliary flashing features wherein the sign may flash during emergency situations.

42. The exit sign of claim 41 wherein the circuit means further comprises audio output means wherein audio signals are provided in conjunction with flashing of said exit sign.

43. The exit sign of claim 22 wherein the exit sign comprises circuit means having auxiliary flashing features wherein the sign may flash during emergency situations.

44. The exit sign of claim 43 wherein the exit may comprise circuit means having means to boost the illumination of the light pipes engaged therewith during emergency situations, 45. The exit sign of claim 43 wherein the circuit means further comprises audio output means wherein audio signals are provided in conjunction with flashing of said exit sign.

46. The exit of claim 23 wherein the exit sign comprises circuit means having auxiliary flashing features wherein the sign may flash during emergency situations.

47. The exit sign of claim 46 wherein the exit may comprise circuit means having means to boost the illumination of the light pipes engaged therewith during emergency situations.

48. The exit sign of claim 46 wherein the circuit means further comprises audio output means wherein audio signals are provided in conjunction with flashing of said exit sign.

49. The exit sign of claim 17 or 18 wherein the exit may comprise circuit means having means to boost the illumination of the light pipes engaged therewith during emergency situations.

50. The exit sign of claim 49 wherein the circuit means further comprises audio output means wherein audio signals are provided in conjunction with increased illumination of said exit sign.

51. The exit sign of claim 22 wherein the exit may comprise circuit means having means to boost the illumination of the light pipes engaged therewith during emergency situations.

52. The exit sign of claim 51 wherein the circuit means further comprise audio output means wherein audio signals are provided in conjunction with increased illumination of said exit sign.

53. The exit sign of claim 23 wherein the exit may comprise circuit means having means to boost the illumination of the light pipes engaged therewith during emergency situations.

54. The exit sign of claim 53 wherein the circuit means further comprises audio output means wherein audio signals are provided in conjunction with increased illumination of said exit sign.

55. The exit sign of claim 44 wherein the circuit means further comprises audio output means wherein audio signals are provided in conjunction with increased illumination of said exit sign.

56. The exit sign of claim 47 wherein the circuit means further comprises audio output means wherein audio signals are provided in conjunction with increased illumination of said exit sign.

* * * * *